July 30, 1940.  F. A. PARSONS  2,209,793
COOKING UTENSIL
Filed April 11, 1938

INVENTOR
Fred A. Parsons

Patented July 30, 1940

2,209,793

UNITED STATES PATENT OFFICE 2,209,793

COOKING UTENSIL

Fred A. Parsons, Milwaukee, Wis.

Application April 11, 1938, Serial No. 201,275

7 Claims. (Cl. 53—6)

This invention relates to cooking utensils, and more particularly to a utensil adapted to utilize a localized heat source, such as a gas or oil burner.

A purpose of the invention is to provide an improved cooker for uniformly applying heat to food or other materials within a container or receptacle which is heated from a localized exterior source.

A further purpose is to provide a cooker of improved operation, efficiency and convenience for use on stoves of usual form, as for example gas or oil stoves, in a manner to utilize the heat source provided by such stoves.

A further purpose is to provide an improved heat distributing and equalizing means for a cooker, such that, for example, a cooker having a length materially greater than its width may be positioned over a burner substantially irrespective of the relative burner position, while still effecting substantially uniform and equal heating of the container portions of the cooker.

A further purpose is to provide a cooker of preferred shape having a length materially greater than its width, whereby to utilize some of the burners of ordinary forms of gas or oil or similar stoves while leaving other burners free for other operations, and providing for such a cooker improved heat distributing means such that any convenient position of the cooker relative to the burner or burners used for its heating have little or no effect on the uniform and equal heating of the container portions of the cooker.

A further purpose is generally to simplify and improve the construction and operation of cookers, and particularly of cookers for one or more of the purposes previously mentioned.

The invention comprises the method and structure herein particularly described and claimed, and also such modifications of such method or structure as are equivalent to the claims.

The same reference characters have been used to indicate the same parts throughout, and in the drawing.

Figure 1:
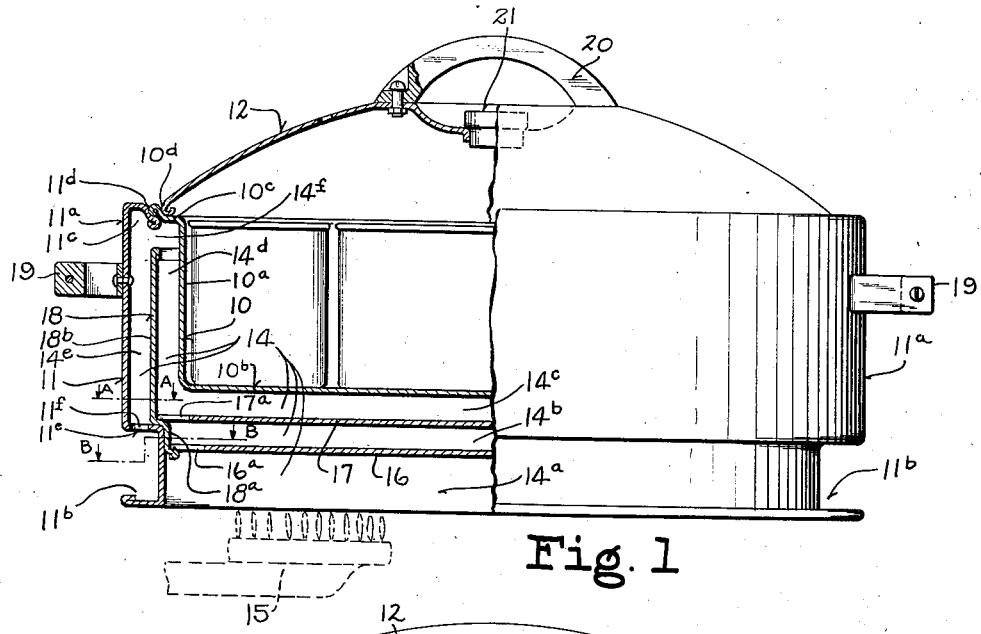
Figure 1 is a side elevation, partly in vertical section along the line 1—1 of Fig. 2 of a cooking utensil incorporating the invention.

The cooker comprises a container generally indicated by the numeral 10, an outer shell or frame removably supporting the container 10 and generally indicated by the numeral 11, and a removable cover 12.

The container 10 is upwardly open, having a side wall 10a, a bottom wall 10b and an outwardly extended flange 10c, the flange providing a downward recess 10d which supports and centers the cover 12.

The shell or frame 11 provides an outside wall 11a having a base portion 11b which is inwardly channeled and a top portion inwardly flanged at 11c to provide a downward recess 11d which supports and centers the container 10.

The construction described supports the container 10 with its bottom wall 10b horizontally disposed at a level materially above the bottom level of the cooker, and with its side wall 10a substantially equally spaced at all points of its periphery from the side wall 11a of the outer shell. Such construction defines a main chamber generally denoted by the numeral 14, which is downwardly open at the bottom of the cooker, but upwardly closed by the engaged flange portions 10c, 11c, and laterally closed by the side walls 10a, 11a except that in the wall or ledge 11e formed by the inwardly channeled base portion 11b, in the cooker of Fig. 1, there are provided openings 11f at substantially all points around the periphery of the outer shell.

The chamber 14, formed by the outer shell 11 and inner receptacle 10, is heated by any suitable source, such as a gas burner 15. Interposed between the heat source and the bottom wall 10b of the container there is a horizontal distributor plate or baffle 16 which forms a bottom horizontal chamber portion 14a from which heated gases may rise upwardly through openings, such as 16a. Interposed between the distributor plate 16 and the bottom wall 10b of the container there is a reflector plate 17 which prevents direct radiation from any localized hot spots on plate 16 to the bottom wall 10b, the reflector plate forming spaced horizontal chamber portions 14b, 14c, heated gases rising into the chamber portion 14b through the openings 16a and passing upwardly into chamber portion 14c through openings such as 17a, the openings such as 16a, 17a substantially completely surrounding the periphery of the plates.

A member 18 is formed with a portion 18a at its lower end which removably supports and positions the member on the inner upper edge of the flange portion 11b, and removably supports and positions each of the plates 16, 17. Member 18 also provides a portion 18b which extends upwardly to divide the upper portions of the chamber 14 into an inner vertical chamber portion 14d and an outer vertical chamber portion 14e, the vertical chamber portions communicating at their top through an opening or passageway 14f, the chambers 14d, 14e and opening 14f extending around the periphery of the container 10.

In the operation of the cooker the heat source 15 continuously provides a considerable volume of highly heated gases which are spread by the plate 16 into the lower chamber portion 14a. The hottest of these gases, being lightest, rise through the openings 16a into the chamber portion 14b, where they are mixed with gases heated by direct radiation from the localized hot spot directly above the burner 15, and the hottest gases of the resulting mixture again rise, through the openings 17a, into the chamber portions 14c, 14d.

Figure 2:
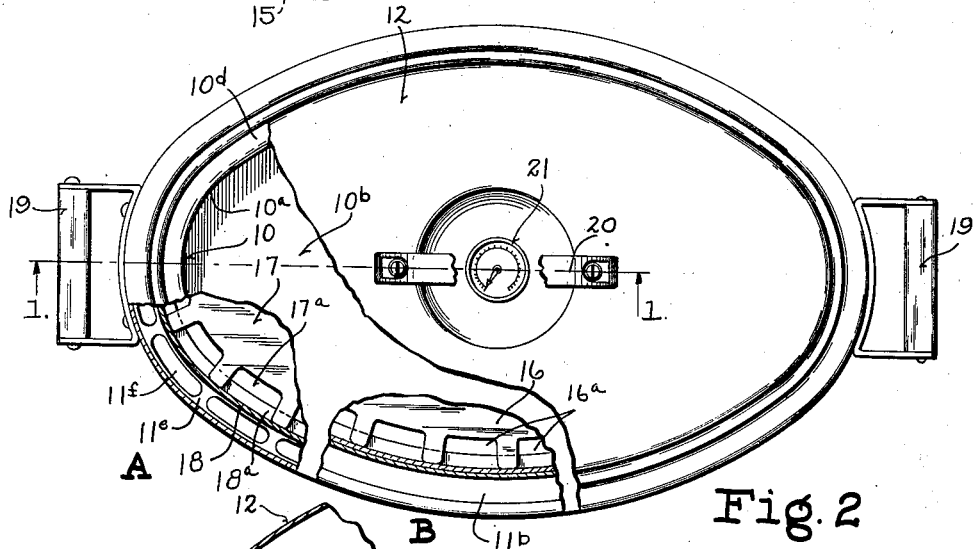
Figure 2 is a top view of the same cooker, a portion A being in horizontal section viewed approximately along line A—A of Fig. 1, and a portion B being in horizontal section viewed approximately along the line B—B of Fig. 1.

The hottest of the gases rising through the openings 17a continue upwardly to seek the highest level in the chamber portions 14c, 14d, 14e, which is the level laterally adjacent the top of the side wall 10a of the container 10, such hottest gases displacing and forcing any cooler gas downwardly, and later being themselves displaced and forced downwardly as they are cooled by contact with the various chamber walls. Cooled gases moving downwardly within the chamber portions 14c or 14d are to some extent reheated by commingling with the hotter uprising gases, but in any event the coolest of the gases will be continuously forced downward until they find outlet. In the cooker of Figs. 1, 2 the coolest gases are adjacent the outer wall, and there is sufficient outflow downwardly through openings 11f that little or no gas spills from the bottom opening of the bottom chamber portion 14a. The localized downward movements, within the chamber portions 14c, 14d tends to maintain the entire body of gas surrounding the side and bottom walls of container 10 at a substantially uniform heat, but somewhat hotter at the upper than at the lower levers, which is as it should be for uniform heating of the container.

For obtaining uniform heating of the container 10, the use of the upward extension 18b of the member 18 is optional. Its use appears, however, to add to the heat efficiency of the device. Similarly, the openings 11f may be omitted, although at a sacrifice of efficiency, the peripheral openings in plates 16, 17 then being required to both pass the hottest gases upwardly and the cooler gases downwardly.

Figure 3:
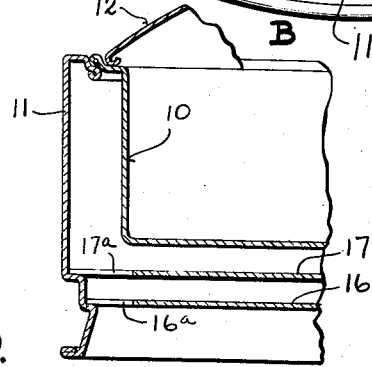
Figure 3 shows a vertical section through a left end portion of a modified form of a cooker which includes some of the broader aspects of the invention.

In the modified form of cooker shown in Fig. 3 both the member 18 and the openings 11f are omitted, as suggested in the preceding paragraph, the plates 16, 17 being supported directly on inward ledges on the outer wall 11. This form, similarly to the cooker of Figs. 1, 2, operates to uniformly heat the container 10, irrespective of the position of the burner underneath the cooker, but requires more heat to be applied in effecting a given temperature of the container.

Handles 19, 19 of any suitable form are fixed to the outer shell 11 for lifting the cooker unit as a whole. Handle 20 is for lifting the cover 12. At an upper level in the chamber directly under cover 12 there is provided a suitable form of temperature indicator as indicated at 21.

What is claimed is:

1. A cooking utensil including a container upwardly open and having side walls and a horizontal bottom wall, an outer shell having side walls laterally spaced outside the side walls of the container and extended downwardly to a level materially below the container bottom wall, said container and outer shell defining a chamber upwardly and laterally closed and extended about the side walls of the container to provide a lateral space between the side container walls and the side walls of said shell, a partition member vertically dividing said lateral space to provide inner and outer vertical chamber portions communicating at their top, said inner vertical chamber portion being adapted at its lower level to receive heated gases from a heat source below the bottom container wall, and said outer vertical chamber having an outlet at a level substantially below the container bottom wall.

2. A cooking utensil including an upwardly open container having side walls and a horizontal bottom wall, an outer shell having side walls spaced outside the side walls of the container to provide a vertical chamber upwardly and laterally closed, said outer shell side walls being extended downwardly to a level materially below the container bottom wall, a plurality of horizontal plates spaced apart below said container bottom wall and above said level to form a plurality of chambers including a lower horizontal chamber, an intermediate horizontal chamber and an upper horizontal chamber, said chambers providing upward openings whereby heated gases from a burner below said bottom chamber may rise upwardly through the horizontal chambers in succession, and a partition member spaced between the side walls of the container and outer shell to divide said vertical chamber into inner and outer vertical chamber portions communicating at their top, said upper horizontal chamber communicating at its periphery with said inner vertical chamber portion, said outer vertical chamber portion having an outlet at a level materially below the bottom wall of said container; whereby said heated gases will successively move upwardly through the horizontal chambers and the inner vertical chamber portion, and downwardly through the outer vertical chamber portion and through said outlet.

3. A cooking utensil including an upwardly open container having side walls and a bottom wall, said container in its horizontal section being of a form of materially greater length than width, a shell having side walls spaced laterally outside the container side walls to provide a vertical chamber upwardly and laterally closed, the side wall of the shell extending materially below the bottom wall of the container to provide a downwardly open horizontal chamber, a plurality of horizontal plates spaced vertically apart in said horizontal chamber to provide lower, intermediate and upper horizontal chamber portions, said horizontal chamber portions communicating at their periphery to provide upward passage for heated gases from a source below the lower chamber, a partition member spaced between said side walls to divide said vertical chamber into inner and outer vertical chamber portions communicating at their top, said upper horizontal chamber communicating at its periphery with the bottom portion of the inner vertical chamber, said outer vertical chamber having an outlet at a level materially below the bottom wall of said inner container.

4. A cooking utensil including a container of a length materially greater than its width and relatively shallow, said container having side walls and a horizontal bottom wall, an outer shell adapted to removably receive and support said container and having side walls laterally spaced outside the side walls of the container and extended downwardly to a level materially below the container bottom wall, said container and outer shell when assembled together defining a chamber upwardly and laterally closed and extended about the side walls to provide a lateral space between the side container walls and the side walls of said shell, a partition member within said lateral space to provide inner and outer chamber portions communicating at the top, said inner chamber portion being adapted at a lower level to receive gases from a heat source below the bottom container wall, said outer shell providing an outlet for said gases materially below the top level of said container and formed and positioned to provide a substantially uniform pressure of said gases at corresponding levels about the side walls of said container.

5. A cooking utensil including a container of a length materially greater than its width and relatively shallow, said container having side walls and a horizontal bottom wall, an outer shell adapted to removably receive and support said container and having side walls laterally spaced outside the side walls of the container and extended downwardly to a level materially below said bottom wall, whereby to define a vertical chamber extended about the container side walls and upwardly and laterally closed and a lower chamber underneath said container bottom wall, said lower chamber communicating at its periphery with said vertical chamber whereby gases from a heat source delivering heated gases to said lower chamber will be delivered to said vertical chamber, and baffle means in said lower chamber substantially preventing direct flow of said gases to the bottom wall of said container, said outer shell providing an outlet for said gases materially below the top level of said container and formed and positioned to provide a substantially uniform pressure of said gases at corresponding levels about the side walls of said container.

6. A cooking utensil including a container of a length materially greater than its width and relatively shallow, said container having side walls and a horizontal bottom wall, an outer shell adapted to removably receive and support said container and having side walls laterally spaced outside the side walls of the container and extended downwardly to a level materially below said bottom wall, whereby to define a vertical chamber extended about the container side walls and upwardly and laterally closed and a lower chamber underneath said container bottom wall, said lower chamber communicating at its periphery with said vertical chamber, and being adapted to receive heated gases at a lower chamber level from a heat source positioned at a point unequally spaced relative to different portions of the side walls of said container, baffle means within said lower chamber substantially preventing direct flow of said gases to the bottom wall of said container and diverting said gases to said vertical chamber, and means operative to substantially uniformly distribute the heat of said gases to said container side walls including an outlet for said gases through said outer shell materially below the top level of said container and formed and positioned to provide a substantially uniform pressure of said gases contacting said container side walls at corresponding levels in spite of said unequal spacing of the heat source.

7. A cooking utensil including a container of a length materially greater than its width and relatively shallow, said container having side walls and a horizontal bottom wall, an outer shell adapted to removably receive and support said container and having side walls laterally spaced outside the side walls of the container and extended downwardly to a level materially below said bottom wall, whereby to define a vertical chamber extended about the container side walls and upwardly and laterally closed and a lower chamber underneath said container bottom wall, said lower chamber communicating at its periphery with said vertical chamber and being adapted to receive heated gases at a lower chamber level from a heat source positioned at a point unequally spaced relative to different portions of said container side walls, and means for substantially uniform heat delivery to said container walls in spite of said unequal spacing of the heat source including baffle means within said lower chamber to deflect said gases to said vertical chamber and an outlet for said gases through said outer shell at a level substantially lower than the top wall of said container and formed and positioned to provide a substantially uniform pressure at corresponding levels of gases containing said container side walls.

FRED A. PARSONS.

CERTIFICATE OF CORRECTION.

Patent No. 2,209,793. July 30, 1940.

FRED A. PARSONS.

It is hereby certified that error appears in the printed specification of the above numbered patent requiring correction as follows: Page 2, first column, line 47, for the word "levers" read --levels--; page 3, second column, line 50, claim 7, for "containing" read --contacting--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.